July 5, 1955 M. H. KOWAL 2,712,397
BOTTLE CARRIERS

Filed March 18, 1950 8 Sheets-Sheet 1

Inventor
Michael H. Kowal
By Wallace and Cannon
Attorneys

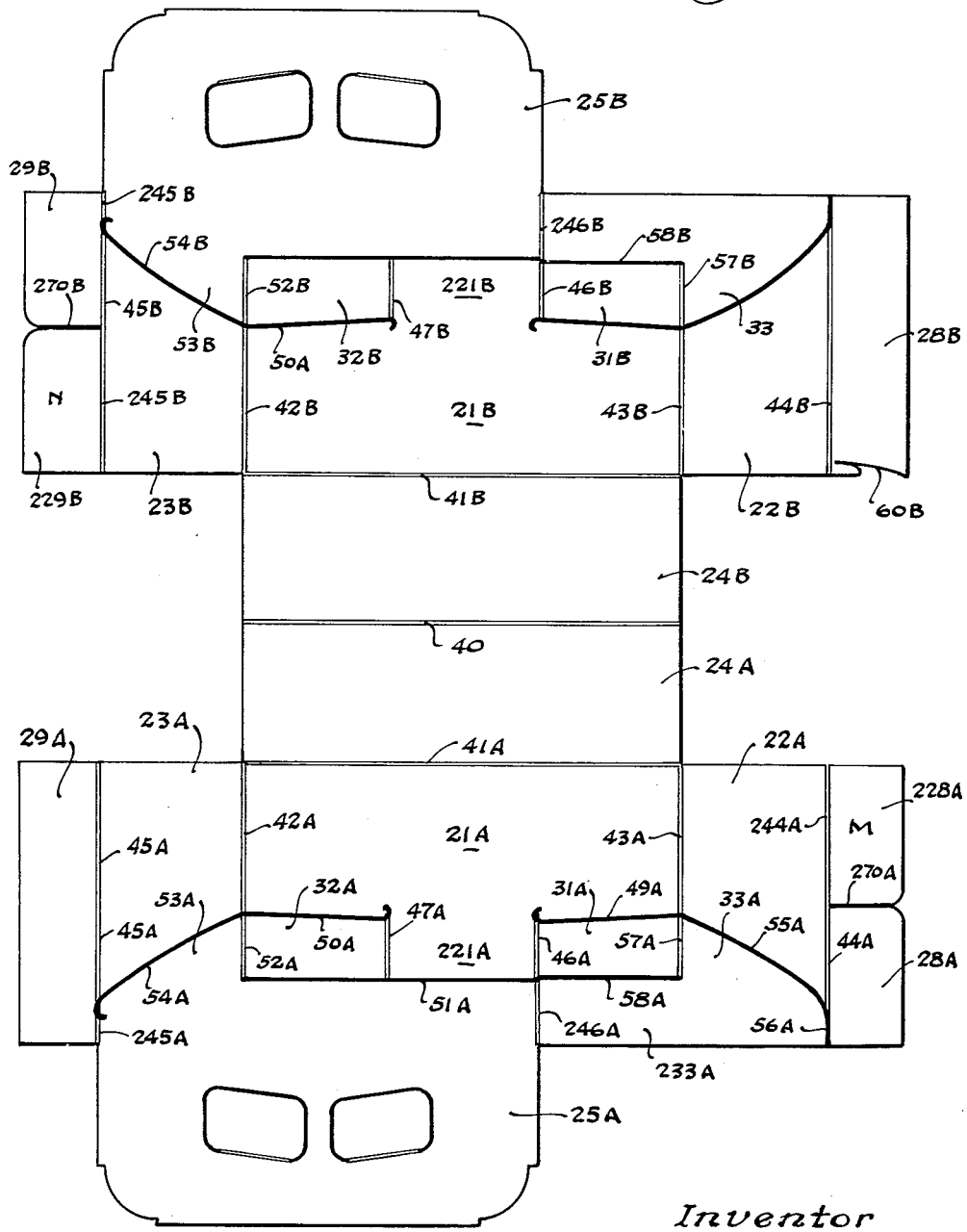

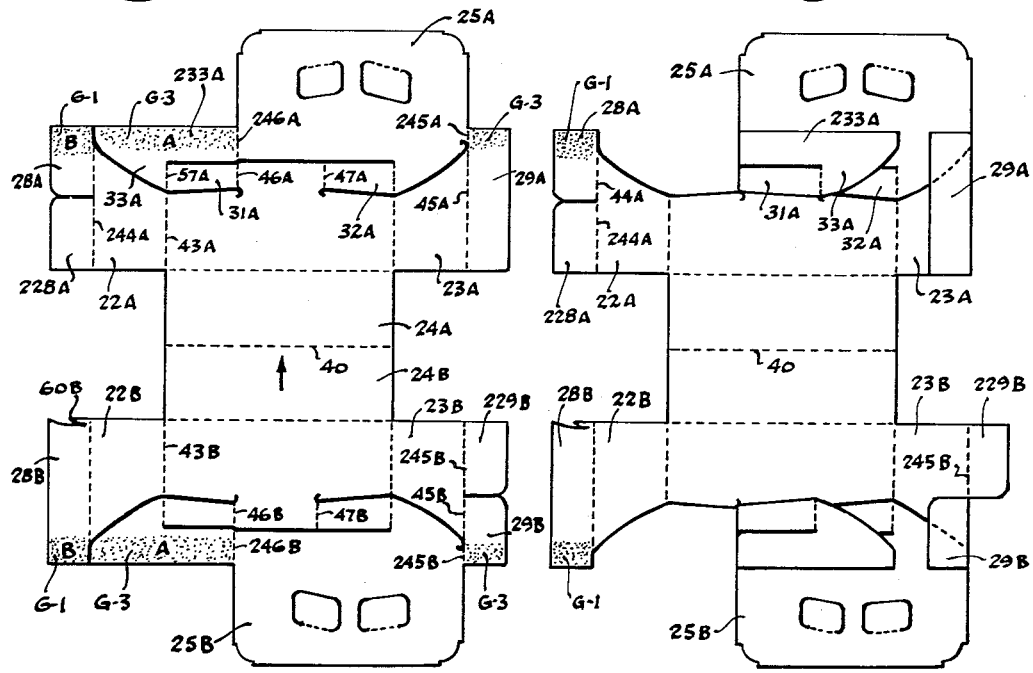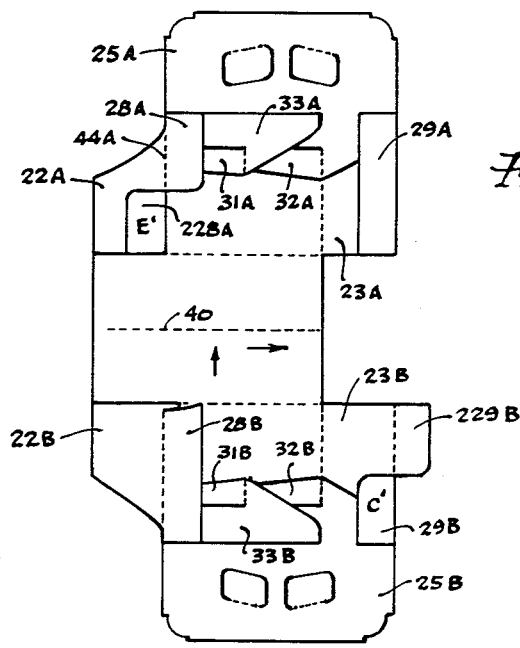

July 5, 1955 — M. H. KOWAL — 2,712,397
BOTTLE CARRIERS
Filed March 18, 1950 — 8 Sheets-Sheet 4
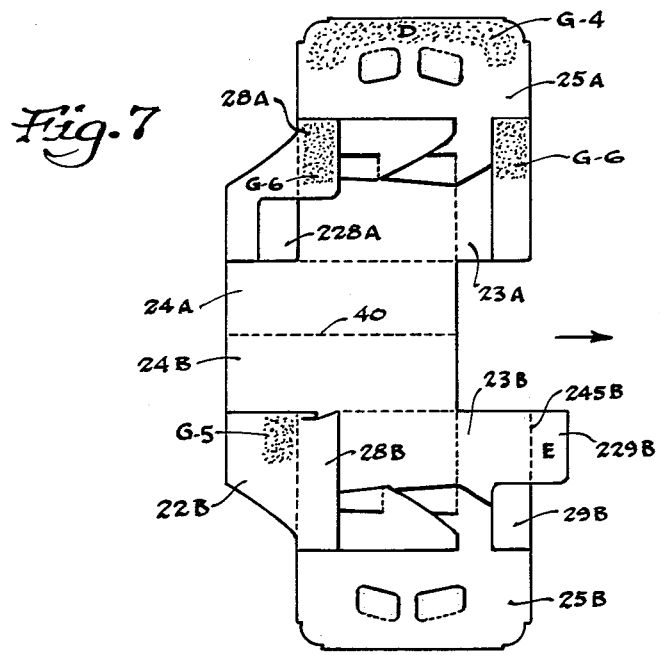
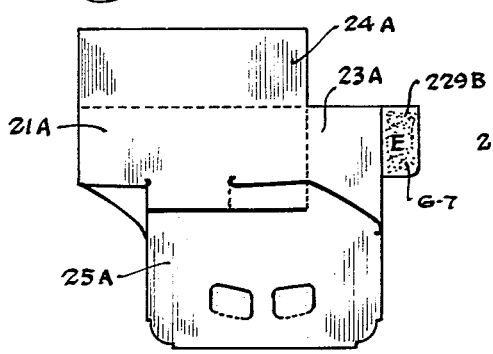 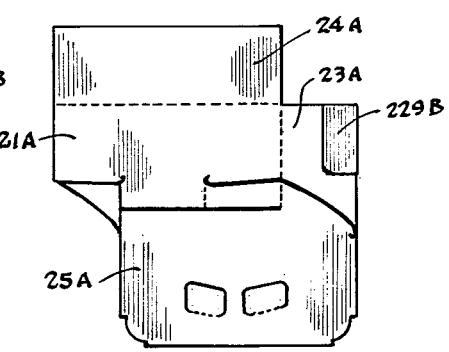
Inventor
Michael H. Kowal
By Wallace and Cannon
Attorneys July 5, 1955　　　M. H. KOWAL　　　2,712,397
BOTTLE CARRIERS
Filed March 18, 1950　　　　　　　　　　8 Sheets-Sheet 5
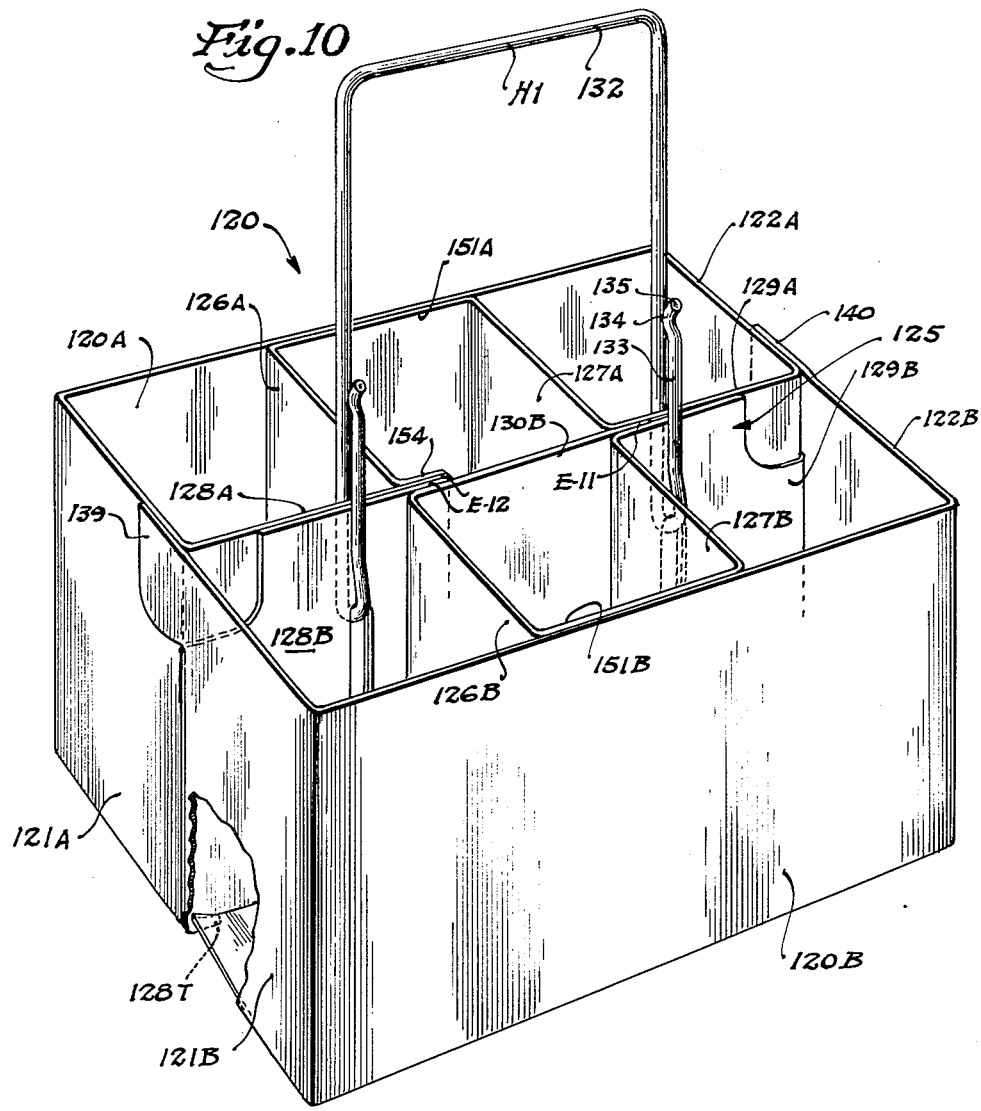
Inventor
Michael H. Kowal
By Wallace and Cannon
Attorneys

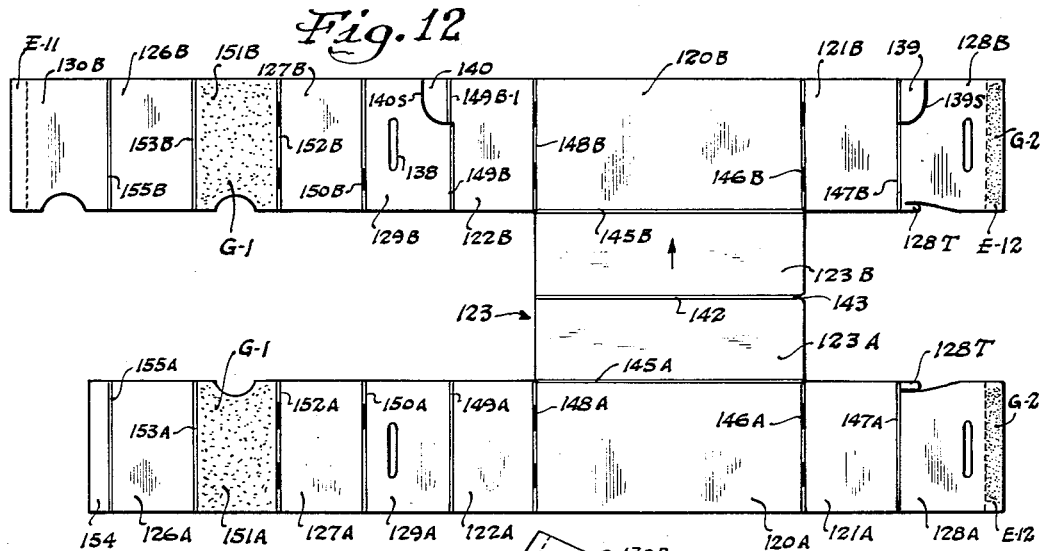
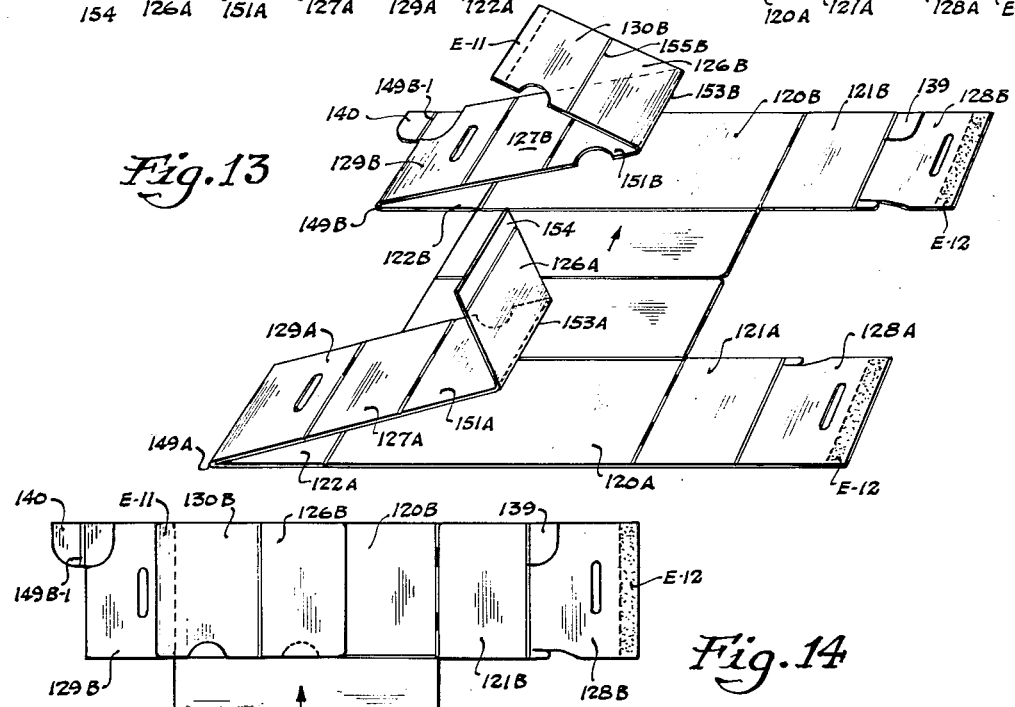
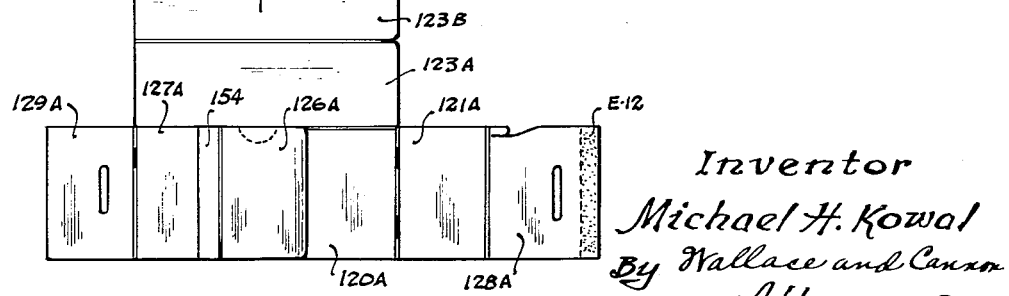

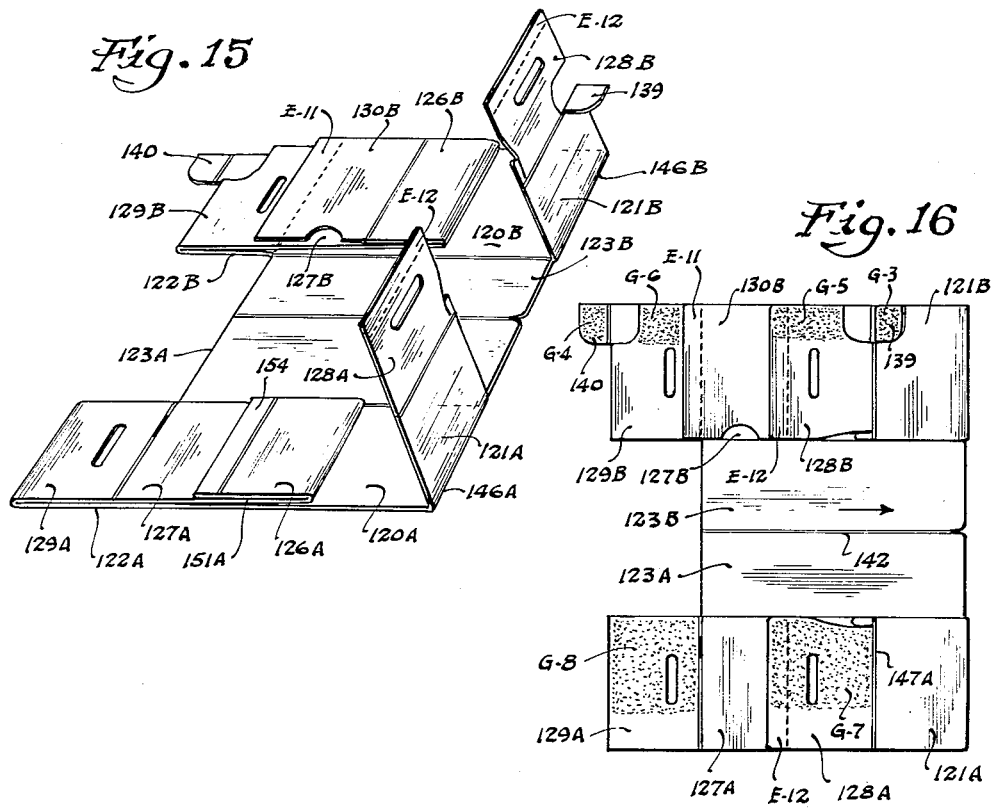
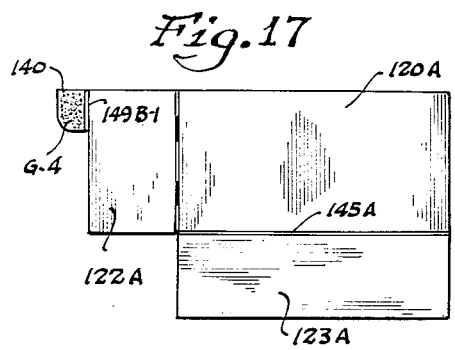
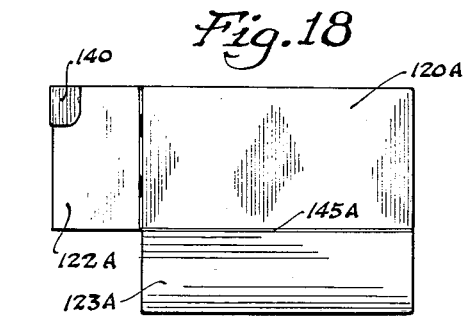

United States Patent Office 2,712,397
Patented July 5, 1955

2,712,397

BOTTLE CARRIERS

Michael H. Kowal, Clifton, N. J., assignor to Empire Box Corporation, Garfield, N. J., a corporation of Delaware Application March 18, 1950, Serial No. 150,415

1 Claim. (Cl. 220—113)

This invention relates to bottle carriers, particularly to those made from sheet material such as cardboard or the like.

Bottle carriers of a general character to which the present invention relates have been made in many different forms from cardboard and like material, and these bottle carriers are made in what is termed collapsible form so that the carriers may be manufactured and shipped in a collapsed or flat form and may be readily erected at the time when such carriers are to be loaded with bottles. The usual arrangement in bottle carriers of this general character provides for carrying six bottles arranged in parallel rows of three bottles each and with an upwardly extending handle disposed between the rows of bottles and adapted to be grasped by the user in supporting the loaded carrier. Such bottle carriers must, of course, be economical insofar as material requirements and manufacturing costs may be concerned, but in many years of merchandising experience wherein bottle carriers have been made in many different forms, it has been found that still other requirements must be met by such carriers in order to render the use thereof practical and economical.

One of the primary requirements that has been encountered in the bottle carrier art is the necessity that the bottle carrier must be of a relatively small size in planform so that the carrier occupies but little greater area than the bottles which are carried thereby, this limitation as to size being imposed by the commercial necessity for the loading of the loaded carriers into cases of the conventional size which have been used for many years in the bottling industry. Another important factor is the desirability of attaining a simplified bottle-loading procedure, and in ths connection it is highly desirable that the carriers be of such character that bottles may be loaded therein by the conventional case-loading machinery that is utilized throughout a large portion of the bottling industry. Thus, it is important that the bottle-receiving openings or compartments of a bottle carrier be of such a character that bottles may be freely dropped into such openings or bottle-receiving compartments, thereby to enable conventional case-loading equipment to function properly when the erected bottle carriers are initially positioned in cases and are loaded by such machinery in the usual case-by-case operation thereof.

When collapsible bottle carriers are constructed from cardboard or like material to attain the foregoing objectives, it is customary to make the end walls of the carrier so that each end wall comprises a pair of end panels that are connected to each other midway between the side walls along vertical fold lines. Now in order that such bottle carriers may be utilized on a proper and economical basis it has been determined that such carriers should be constructed so that they may be used in several bottle-transporting or carrying trips, but where the end panels of such carriers are connected together along central fold lines in the various ways heretofore known, there has sometimes been a tendency for the two panels at each end thereof to become disconnected or separated from each other in the use of the carrier. It is therefore the primary object of the present invention to enable bottle carriers to be made from cardboard or like sheet material in such a way that the structural parts thereof will withstand the forces and abuses incident to the use of such bottle carriers in several bottle-transporting operations or trips, and a related object is to accomplish this in a simple and expeditious manner.

In bottle carriers of the aforesaid character, the pivotal connection between the end panels is in many instances attained by affording inwardly bent attaching flaps on the two panels, which flaps are secured adhesively together to thereby pivotally connect the end panels while at the same time affording a dividing or separating means such as part of a central division wall. With such structure, it is found that the adhesively secured flaps may separate from each other, thus to limit the useful life of the carrier, and to enable this to be avoided is a more specific object of the present invention.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 3 is a face view of the cardboard blank utilized in constructing the bottle carrier of Fig. 1;

Figs. 4 to 9 are views on a reduced scale which illustrate the successive folding and gluing steps that are performed in constructing the bottle carrier in Fig. 1 from the blank of Fig. 3;

Fig. 10 is a perspective view of an alternative embodiment of the invention;

Figs. 12 to 18 are views illustrating the successive gluing and folding steps that are performed on the blank of Fig. 11 to produce the bottle carrier of Fig. 10.

Figure 1:
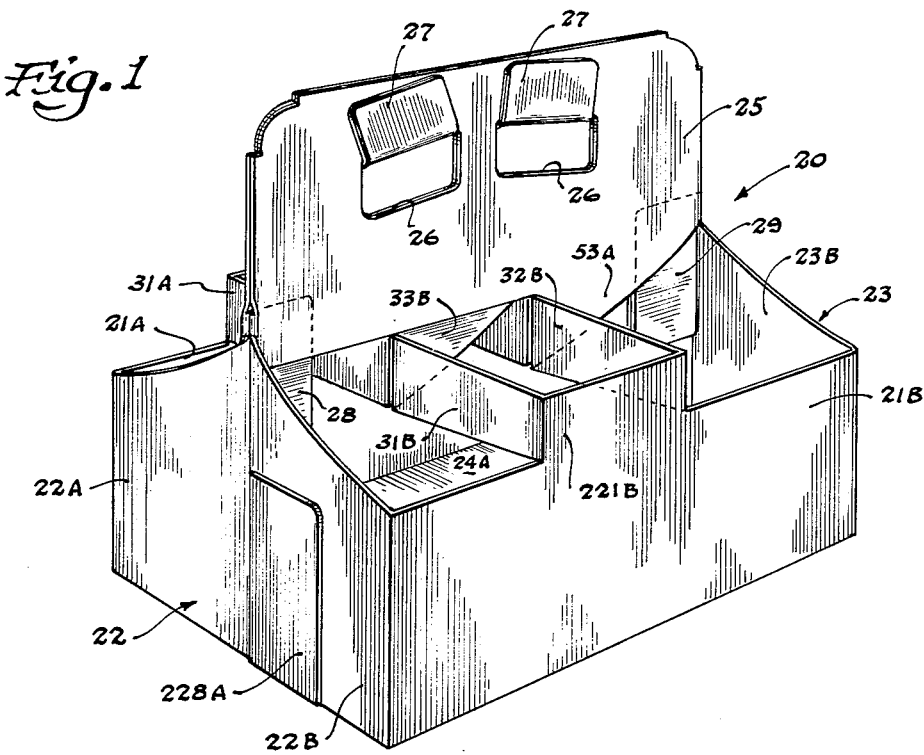
Fig. 1 is a perspective view illustrating a bottle carrier embodying the features of the invention.
Figure 2:
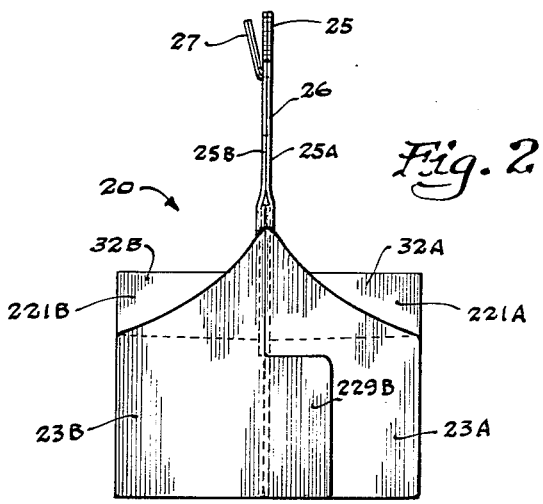
Fig. 2 is an end view of the bottle carrier shown in Fig. 1.

In order that the full utility and usefulness of the present invention may be fully realized, the invention is herein illustrated as embodied in two different bottle carriers, the first of which is shown in Figs. 1 to 9 of the drawings as embodied in a bottle carrier 20 that is adapted to receive six bottles in two parallel rows of three bottles each. This carrier 20 is disclosed in certain of its aspects in the copending application of Michael H. Kowal, Serial No. 33,368, filed June 16, 1948, now Patent No. 2,692,700. The carrier 20 is made from cardboard or like sheet material to embody, when erected, upstanding side walls 21A and 21B that are connected at opposite ends by the end walls 22 and 23, these end walls being made up, respectively, of two foldably related panels 22A and 22B, and 23A and 23B. The lower edges of the two side walls 21A and 21B are connected by bottom panels 24A and 24B that are foldably connected to the lower edges of such side walls and are foldably related to each other along a central line disposed midway between the two side walls 21A and 21B. Disposed in a plane that is midway between the two side walls 21A and 21B an upstanding handle 25 is afforded in which a pair of finger-receiving openings 25 and related cushioning flaps 27 are formed in the usual manner.

The handle 25 is connected to the end walls 22 and 23 through the medium of riser members 28 and 29 that serve, as will hereinafter be described, to connect the adjacent edges of the panels that form these two end walls, and the riser members 28 and 29 extend upwardly into position between panels 25A and 25B that afford the handle 25. The riser members 28 and 29 are disposed relatively close to the end walls of the carrier and serve as bottle separating members between the end bottles in the adjacent rows.

The bottles in each row are separated by separating bars that extend between the side walls and the handle 25 at substantially the one-third points along the carrier, and these separating bars are pivotally connected along vertical axes to the handle 25 and the respective side walls. Thus, each of the side walls has an upward extension in the middle one-third thereof, the extension being identified as 221A on the wall 21A and as 221B on the wall 21B. Each such extension 221A and 221B is formed in an integral and uncreased relationship with respect to the related side wall, and as shown in Fig. 1 of the drawings, a separating bar 31B extends from one end edge of the extension 221B to the related point along the lower edge of the handle 25, while a separating bar 32B extends from the other vertical end edge of the extension 221B to the related point at the lower edge of the handle 25. Similar separating bars 31A and 32A serve to connect the opposite end edges of the extension 221A with the handle 25, thereby to divide each side portion of the carrier into a row of three bottle-receiving openings, each of which is defined by narrow vertical edges of vertically disposed portions of the cardboard material.

It should be observed that the separating bars 32A and 32B are pivotally connected to integral portions of the lower portion of the handle 25 as will hereinafter be described in detail, while the inner ends of the separating bars 31A and 31B are connected to joining panels 33A and 33B, respectively, that are secured in position between the handle panels 25A and 25B so that a relatively rigid mounting portion of such joining panels projects downwardly below the lower edge of the handle panels to afford the desired vertical pivotal axes for the inner ends of the separating bars 31A and 31B.

In producing the carrier 20 that is shown in Fig. 1 in its erected condition, a blank is made from cardboard or like material in the form illustrated in Fig. 3 of the drawings. In this blank, the two bottom panels 24A and 24B are joined together along a central longitudinal fold line 40, and the side wall 21A is joined to the opposite edge of the bottom panel 24A along a fold line 41A. At the left hand end of the side wall 21A, Fig. 3, the end panel 23A is joined along a fold line 42A, while at the other end of the side wall 21A, the end panel 22A is joined along a fold line 43A. The riser panels 28A and 29A are joined respectively along other edges of the end panels 22A and 23A by fold lines 44A and 45A, and it will be noted that the fold lines 42A, 43A, 44A and 45A are all parallel. The extension 221A is, of course, formed in an integral and uncreased relationship along the other or upper edge of the side wall 21A, and the separating bar 31A is connected along a vertical fold line 46A to one end of the extension 221A, while the other separating bar 32A is connected along a vertical fold line 47A to the other end of the extension of 121A. It will be observed that the separating bars 31A and 32A are, in the blank, disposed adjacent to the upper edges of the side wall 21A, and a slit 49A extended from the lower end of the fold line 46A to the upper end of the fold line 43A substantially parallel to the lower fold line 41A serves to physically separate the adjacent edges of the side wall 21A and the separating bar 31A. Similarly, a slit 50A extends from the lower end of the fold line 47A to the upper end of the fold line 42A, thereby to physically separate the adjacent edges of the bar 32A and the side wall 21A. The handle panel 25A is in effect offset to the left in the blank from the side wall 21A as shown in Fig. 3, and a slit 51A extended from the upper end of the fold line 46A and to the left in Fig. 3 serves to separate the handle panel 25A from the upper edge of the extension 221A and from the upper edge of the separating bar 32A. The slit 51A terminates at the upper end of a fold line 52A which is aligned with the fold line 42A, and this fold line 52A serves to connect the other or inner end of the bar 32A to a connecting extension 53A which extends downwardly below the lower edge of the handle 25A as such edge is defined by the slit 51A. The downward extension 53A is defined at its lower edge by slit 54A which extends from the upper end of the fold line 42A to the fold line 45A. In the present instance this slit 45A extends from the adjacent end of the slit 50A in an upward angular direction, thus to define a sloping upper edge for the end panel 23A. It will be observed that the fold line 45A that connects the end panel 23A with the riser panel 29A extends upwardly as at 245A beyond the adjacent end of the slit 54A, thereby to pivotally connect the riser panel 29A with the left hand edge of the handle panel 25A as viewed in Fig. 3.

The securing panel 33A is disposed, in part, above the end panel 22A as shown in Fig. 3, and a sloping slit 55A, corresponding to the slit 54A at the other side of the blank, extends from the upper end of the fold line 43A to the upper end of the fold line 44A, and a slit 56A extends from the left hand end of the slit 55A upwardly in alignment with the fold line 44A so as to completely sever the securing panel 33A from the riser panel 28A. The securing panel 33A thus has a downward extension portion similar to the extension 53A, and this extension is connected along a fold line 57A to the other or inner end of the separating bar 31A. As will be evident in Fig. 3, the securing panel 33A has an extended portion 233A disposed immediately above a portion of the bar 31A and a slit 58A that is parallel to the fold line 41A, extends to the left, Fig. 3, from the upper end of the fold line 57A to thereby separate this extended portion 233A from the bar 31A. The extended portion 233A is joined to the handle panel 25A by an extension 246A of the fold line 46A.

On the other side of the central fold line 40, the elements are in most respects symmetrical with the elements thus far described, and the same reference characters are used with the suffix "B" in each instance.

It will be observed that the riser panels 28A and 29B extend only part way down along the edges of the end panels to which they are attached, and beneath the riser panels 28A and 29B, respectively, reinforcing flaps 228A and 229B are formed. The flap 228A is connected to the end panel 22A by a fold line 244A which is aligned with the fold line 44A, the flat 228A and the riser panel 28A being separated by a slit 270A. Similarly the flap 229B and the riser panel 29B are separated by a slit 270B, and the flap 229B is joined to the end panel 23B by a fold line 245B that is a continuation of the fold line 45B. These flaps 228A and 229B are utilized under the present invention to impart unusual strength and ruggedness to the carrier, as will hereinafter be described.

With the blank shown in Fig. 3 of the drawings, the successive gluing and folding operations may be performed in substantially the sequence shown comparatively by Figs. 4 to 9, inclusive, of the drawings, but for purposes of clarity of disclosure, these folding and gluing operations are shown in considerable detail and in many instances it may be desirable to perform at least certain of such folding and gluing operations concurrently rather than in sequence as illustrated in the aforesaid series of views. Thus, as the first operation in the formation of the carrier from the blank of Fig. 3, glue is applied to glue areas G–1 on the upper inner faces of the riser panels 28A and 28B, in areas G-2 on riser panels 29A and 29B, and in areas G-3 and along the upper portions of the securing panels 33A and 33B and the related extended portions 233A and 233B, as shown in Fig. 4. The first folding operation is then performed by folding the separating bars 31A and 31B and the related extensions 233A and 233B along the fold lines 46A, 246A, 46B and 246B from the relationship shown in Fig. 4 to the relationship shown in Fig. 5. This locates the glued upper portions G-3 of the securing panels 33A and 33B and extension 233A and 233B in contact with the handle panels 25A and 25B, so that these securing panels are in effect attached to the inner faces of the handle panels. It should be noted, however, that the separating bars 31A and 31B are disposed against the unglued surfaces of the extensions 221A and 221B so that these separating bars will be free to move in the manner required in the final use or erection of the carrier.

The riser panels 29A and 29B are then folded along the fold lines 45A and 145A as applied to the riser panel 29A, and 45B and 245B as applied to the riser panel 29B. This shifts the riser panels 29A and 29B from the relationship shown in Fig. 4 to the relationship shown in Fig. 5, and the engagement of the glued upper portions G-3 of these riser panels with the handle panels serves to secure these riser panels in a face-to-face relationship with respect to the related handle panels. It will be observed that in such folding of the riser 29B, the flap 229B is allowed to remain in its extended position. After this folding operation, the end panels 22A and 22B are folded along the fold lines 43A and 43B, respectively, from the positions shown in Fig. 5 to the positions shown in Fig. 6. This brings the glued upper extending portions G-1 of the riser panels 29A and 29B into contact with the extensions 233A and 233B which are themselves glued to the handle panels so that these riser panels in their upper portions are thereby secured to the respective handle panels. In this folding operation, the flap 228A is in effect held back so as to be folded along the fold line 244A and be thus positioned on top of the end panel 22A, as shown in Fig. 6.

Glue is then applied to the handle panel 25A in the glue area G-4 as shown in Fig. 7, this area being along what may be termed the upper portion of this handle panel, and glue is applied in an area G-5 on the end panel 22B, as shown in Fig. 7. Glue is also applied to the exposed faces of the riser panels 28B and 29B in glue areas G-6 that extend throughout the upper portions of these panels. The blank is then folded along the central fold line 40 from the relationship shown in Fig. 7 to the relationship shown in Fig. 8, so that the riser panels 28A and 28B are glued together and afford a pivotal connection between the adjacent end panels 22A and 22B. In this same folding operation the riser panels 29A and 29B are secured together so that the lower portions thereof afford a pivotal connection between the end panels 23A and 23B while the upper portions serve to connect or join the vertical marginal edges of the handle panels together. Moreover, in this folding operation, the flap 228A is glued to the end panel 22B in a face-to-face relation as will be evident in Fig. 1, the glue area G-5 serving to secure these parts together, and the flap 228A serves in the erected carrier to prevent separation of the riser panels 28A and 28B so as to render the carrier more rugged and useful.

Glue is then applied to a glue area G-7 on the flap 229B, as shown in Fig. 8, and the flap 229B is folded to the position shown in Fig. 9 so as to be secured to the end panel 23A. The flap 229B thus holds the risers 29A and 29B against separation.

The carrier 20, in the folding operations that have just been described, is completed in the collapsed form shown in Fig. 9 of the drawings, and the carrier is normally shipped and stored in this collapsed form. When the carrier is to be erected, opposing forces are applied to the side wall 21A at the left hand end thereof as viewed in Fig. 9 and to the right hand edge of the end wall 23A, Fig. 9. This causes the carrier to move toward and into the erected relationship shown in Fig. 1, and when this movement has been continued until the center line of the handle is aligned with the center line of the side walls, the carrier will assume the fully erected relationship shown in Figs. 1 and 2 of the drawings. The carrier 20 may be maintained in the fully erected position by locking lug 60B formed on the lower edge of the riser panel 28B, this lug being adapted to engage the end edge of the bottom panels 24A and 24B.

In this fully erected condition, the carrier of the present invention may be disposed in the conventional cases used in the bottle industry, and the bottle loading operations may be performed readily and easily, and conventional case-loading machinery may be used if desired.

In Figs. 10 to 18 of the drawings the invention is illustrated as embodied in a bottle carrier 120 that is, in most of its major elements, similar to the bottle carrier shown in the copending application of Maynard G. Hall and Michael H. Kowal, Serial No. 25,414, filed May 6, 1948, now Patent No. 2,508,943, but means are afforded in bottle carrier 120 which increases the strength and ruggedness of the carrier by materially reducing the possibility of separation of the end panels at their juncture with the central partition.

Thus, for purposes of disclosure, a bottle carrier 120 is made from cardboard or like sheet material and embodying side walls 120A and 120B, end walls 121 and 122, with a bottom wall 123 extended between the lower edges of the side walls 120A and 120B so that this bottom wall 123 may serve to support the several bottles that may be disposed in two rows of three bottles each on opposite sides of an upwardly extending central handle which in the present instance is afforded by a handle H-1 made from wire or like material. The rectangular space defined in the erected carrier between the side walls 120A and 120B and the end walls 121 and 122 is divided into six bottle-receiving compartments that are defined in part by a sectionally formed central partition 124, Fig. 10, and a plurality of transverse partition walls 126A, 126B, 127A and 127B. The sectional central partition 125 is formed by a number of panels, and adjacent the end wall 121 this central partition is defined by a double thickness wall made up of panels 128A and 128B. Similarly, near the end wall 122 the central partition is made up of panels 129A and 129B. In the intermediate portion of the carrier, however, the central division wall is afforded by a single panel 130B.

The handle H-1 as illustrated in Fig. 10 is made from a round steel wire which in its central portion is formed to a widened and arcuate cross-section to afford a gripping portion 132, and from opposite ends of this gripping portion the material is extended downwardly and at the lower end thereof the material is bent reversely at 133 in an upward direction for a substantial distance, and at the upper ends of the reversely bent portions 133, hook elements 134 are formed. Above the hook elements, an outwardly sloping guiding lip 135 is provided so that when the bottle carrier 120 is erected the guiding portions 135 may be inserted through vertically elongated connecting slots 138 that are formed in the panels 128A and 128B at one end and the panels 129A and 129B at the other end. The length of the reversely bent portions of the handle H-1 and the vertical extent of the slots 138 cooperate to enable the handle H-1 to be raised to an operating or carrying position, or to be depressed to the level of the tops of the bottles, thereby to permit stacking of loaded bottle carriers 120 directly on top of one another.

In attaining the increased life in the carrier 120, the panel 128B is formed with a slit line 139S that extends downwardly from the upper edge of the panel 128B and in spaced relation to the fold line 147B, and this slit line is then curved toward the fold line 147B, at which fold line the slit 139S is terminated. This serves to afford a glue tab 139 which is folded and attached in the assembly operation in a manner that will be described hereinafter. A similar tab 140 is formed from the material of the panel 129B, a slit 140S being extended downwardly from the upper edge of the panel 129B and being curved to the right as viewed in Fig. 11, so as to terminate at the fold line 149B. It will be observed that above the horizontal portion of the slit 140S, the fold line 149B is slightly offset to the left as indicated at 149B–1, this being done in order to assure proper folding operation of the carrier and at the same time to simplify the folding and attaching operations necessary in the manufacture of the carrier.

Figure 11:
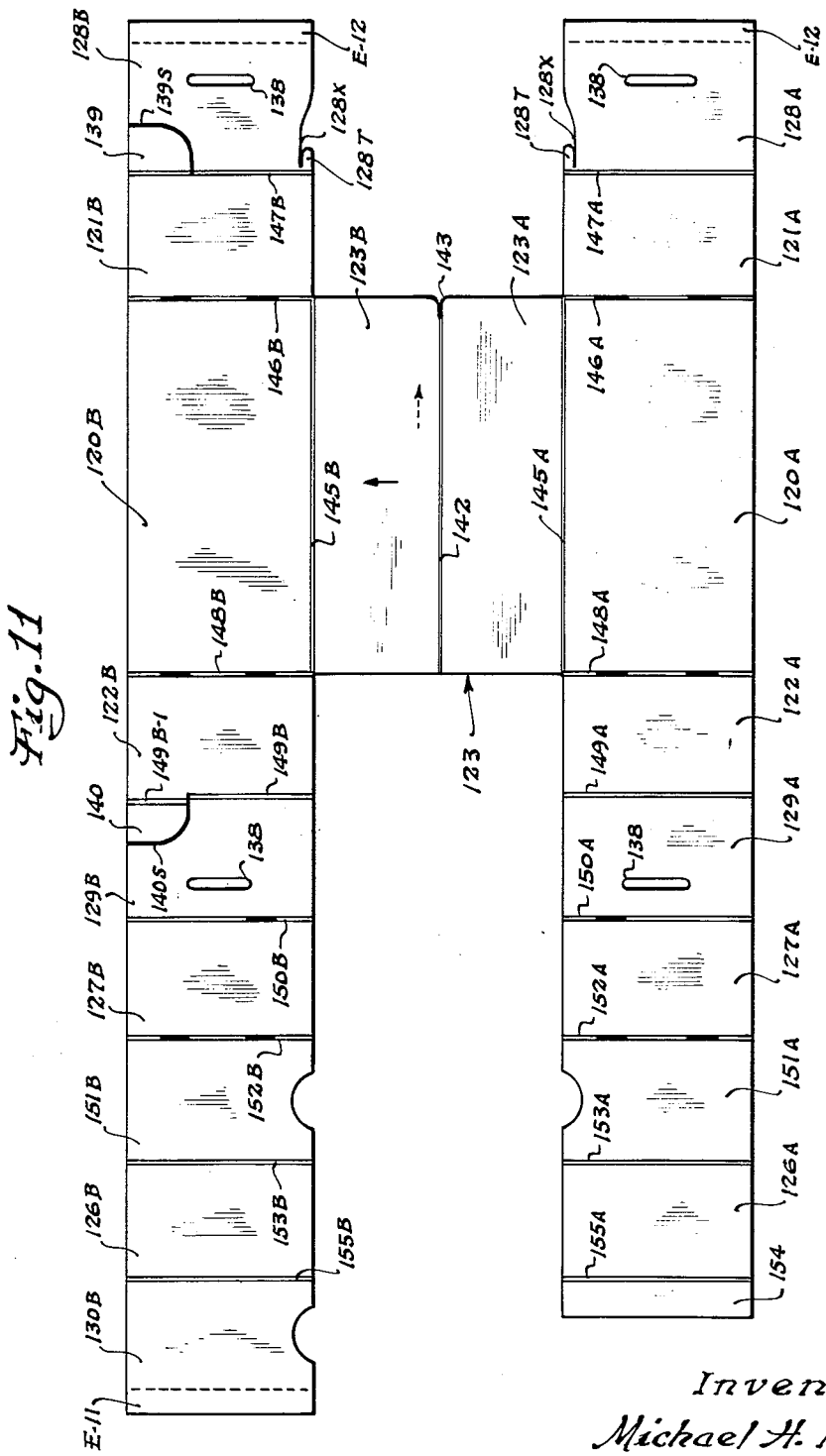
Fig. 11 is a plan view of what may be termed the inside surface of the blank that is used in producing the carrier of Fig. 10.

In the manufacture of the bottle carrier of Fig. 10, the blank shown in Fig. 11 of the drawings is made from cardboard or like sheet material. Thus, the blank shown in Fig. 11 provides the bottom wall 123 in the form of two rectangular panels 123A and 123B of the same size and shape that are joined along a central longitudinal fold line 142. Near the right-hand end of the fold line 142, the material of the bottom wall is cut away along the fold line to afford an inwardly extending notch 143.

Along the other edge of the panel bottom 123A, the side wall 120A is connected along a fold line 145 that is parallel to the central fold line 142. The end walls 121 and 122 are, as will be evident in Fig. 10, each formed as a pair of foldably related panels, the end wall 121 being provided by connecting panels 121A and 121B, while the end wall 122 is afforded by panels 122A and 122B. Thus, in Fig. 11 of the drawings, the end panel 121A is joined to the right-hand end of the side wall 120A along a weakened fold line 146A that in effect is an extension of the right-hand end of the bottom panel 123. To the right of the end panel 121A, the panel 128A is connected along a fold line 147A to the other or right edge of the panel 121A.

In the edges that in the erected carrier are to constitute the lower edges of the panels 128A and 128B, retaining tabs 128X are formed as shown in Fig. 10 by converging slits 128Y which form a tab 128T on each panel 128 adjacent to the fold lines 146A and 146B. This tab 128T faces or extends horizontally away from the adjacent end panels 121A and 121B, and the two slits or cuts 128Y extend along the upper edge of the tab 128T so as to afford a locking or retaining notch, the purpose of which is to engage with the notch 143, to hold the carrier in its erected condition.

At the other or left-hand end of the side wall 120A, the end panel 122A is connected to the end edge of the side wall along a weakened fold line 148A, and the left-hand edge of the end wall panel 122A is joined to the panel 129A along a fold line 149A. The panel 127A is joined along a slightly weakened fold line 150A to the other edge of the panel 129A, and a glue panel 151A is connected along a weakened fold line 152A to the other edge of the panel 127A. The other edge of the glue panel 151A is connected along a fold line 153A to one edge of the panel 126A, this panel 126A having a glue flap 154 connected thereto at its other edge along a fold line 155A.

The elements of the blank that are associated with the bottom panel 123B are disposed in a substantially similar but reverse relationship, but in most instances the corresponding panels are disposed in alignment on opposite sides of the blank. Thus, the bottom panel 123B is joined along a fold line 145B to the lower edge of the side wall 126B, and at the right-hand end of the side wall 120B, the end panel 121B is connected by a weakened fold line 146B. The other edge of the end panel 121B is connected along a fold line 147B to one edge of the panel 128B.

The other end panel 122B has one of its edges joined along a weakened fold line 148B to the left-hand end edge of the side wall 129B, Fig. 14, and the other edge of the end panel 122B is connected along a fold line 149B to one edge of the panel 129B. The other edge of the panel 129B is connected along a slightly weakened fold line 150B to one edge of the partition panel 127B. At the other edge of the panel 127B, a glue panel 151B is connected along a weakened fold line 152B, the other edge of this glue panel being connected along a fold line 153B to one edge of the partition panel 126B. At the other edge of the partition panel 126B, a fold line 155B is effective to join one edge of the dividing panel 130B, this being in contrast to the structure in the other half of the blank, where it will be noted that the partition panel 126A has a glue flap 154 joined thereto.

As will be evident in Fig. 10, the several bottle receiving compartments are formed so as to be square, and the size of the square is such that the bottles will be snugly received within these bottle-receiving compartments. Thus, in Fig. 11, it will be observed that the panels 121A, 122A, 129A, 127A, 151A and 126A are identical in width, and this width is equal to the side dimension of the bottle-receiving compartments or openings that are to be formed in the finished carrier. The same thing is true with respect to corresponding panels in the other section of the blank. With respect, however, to the panels 123A, 128B and 130B, the horizontal dimension of such panels is increased in an amount sufficient to allow for overlapping of these panels with other elements of the structure in securing the blank together. Thus, the panel 130B has an extension E–11 at its left hand edge, while the panels 28A and 28B have extensions E–12 formed at the right-hand edge thereof. These panels, therefore, are of a width that is greater than the other panels, and the extensions E–11 and E–12 are formed in a rigid or uncreased relationship with respect to the panels to which they are related.

In the assembly of the carrier 120, the gluing and folding operations are performed in the advantageous sequence that is illustrated in detail in Figs. 12 to 18 of the drawings. Thus, as the blank is advancing through the machine in the direction of the arrow in Fig. 12, glue is applied to the panels 151A and 151B in glue areas G–1 and is applied to the extensions E–12 in glue areas G–2, Fig. 15. In continued movement of the blank after the glue areas G–1 and G–2 have been applied, the blank is folded along lines 149A and 149B, in the manner shown in the perspective view constituting Fig. 13, and this is done in such a way as to allow the tab 140 to remain in the plane of the adjacent panel 122B. In the course of the folding of the panels 129A and 129B to the right as shown in Fig. 13, the blank is folded to the left along the fold lines 153A and 153B, so that when this folding operation has been completed the panels 126B and 130B will be disposed respectively over the panels 151B and 127B, while the panel 126A will be disposed over the panel 151A. The glue flap 154 will at this time be disposed over the right-hand border area of the panel 127A while the extension E–11 will be disposed over the right-hand border portion of the panel 129B. The glue areas G–1 will, of course, be engaged with the middle one-third portions of the side walls 120A and 120B so as to adhere the panels 151A and 151B respectively to such side walls. The blank will then be in the form and relationship shown in Fig. 14.

As the blank continues its movement in the direction of the arrow in Fig. 14, the panels 121A and 121B are folded over to the left as illustrated in Fig. 15, and as such folding progresses the tab 139 is held against movement with the panel 128B so as to thereby effect a folding of the tab 139 to the right, as shown in Figs. 15 and 16. The tab 139 thus assumes a position on top of a portion of the panel 121B, as shown in Fig. 16. This folding operation also brings the glue areas G–2 into adhering relation with respect to the glue flap 154 and a right-hand border portion of the panel 130B, as will be evident from a comparison of Figs. 15 and 16.

With the blank in the form and relationship of Fig. 16, the direction of movement of the blank is changed, and the blank moves in the direction of the arrow in Fig. 16. In such movement of the blank, glue is applied in several glue areas, as will now be described.

On the upper portion of the blank, as shown in Fig. 16, glue is applied to the tabs 139 and 140 as indicated respectively at G-3 and G-4, and in substantially the same vertical area, or, in other words, adjacent to the upper bordering edges of the blank, and glue area G-5 is applied to the exposed face of the panel 128B, and glue area G-6 is applied to the exposed area of the panel 129B. On the other or lower portion of the blank, glue is applied in an area G-7 to the panel 128A, while glue is applied in an area G-8 to the panel 129A. The glue panels G-7 and G-8 extend toward the lower portions of the panels, as viewed in Fig. 16, so that in the next folding operation, when the blank is folded along the line 142, the areas G-5 and G-7, will effectually secure the panels 128A and 128B together throughout substantially their entire area while the glue areas G-6 and G-8 will effectually secure the panels 129A and 129B together throughout substantially their entire areas. Such folding operation also enables the glue area G-3 to secure the tab 139 to the surface of the panel 121A adjacent to the fold line 147A. The folding operation is effected by bending the bottom panel 123A upwardly so as to press the panels 129A and 128A downwardly against the respective panels 129B and 128B, the panel 121A at the same time being pressed against the tab 139. This brings the blank to the form shown in Fig. 17, and the formation of the carrier is completed by folding the tab 140 over along the fold line 149B-1 and over onto the outer face of the panel 122A, thereby causing the glue area G-4 to adhere to the panel 122A and bringing the carrier to its completely folded and formed condition as shown in Fig. 18 of the drawings.

From the foregoing it will be apparent that the present invention affords a collapsible bottle carrier made from cardboard or like sheet material in such a way that this bottle carrier will withstand use in a number of bottle transport operations. Moreover, it will be evident that the bottle carrier afforded by the present invention meets all of the other known requirements for such devices and is capable of economical manufacture.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

A collapsible open-topped compartmented bottle carrier formed from cardboard or like material and comprising, when erected, bottom and side walls, center and cross partitions, and end walls each comprised of two panels interconnected at their inner ends along vertically disposed fold lines, the end and side walls and the partitions defining six compartments disposed in two rows of three each, the center partitions being formed at least in part by inwardly directed integral extensions of the two panels at the opposite ends of the carrier, said extension each being substantially the full height of said panels and being connected in face-to-face relation, and strengthening flaps at each end of said carrier joined along vertical fold lines to one of the end panels at each end of the carrier and formed by transversely severing a corresponding one of said end panel extensions at each end of the carrier, said strengthening flaps being folded outwardly at substantially right angles with respect to the remaining portions of the end panel extensions that are joined face-to-face as aforesaid, and said strengthening flaps each further being secured in exterior face-to-face relation to the end panel which is adjacent the end panel to which said flap is joined along a vertical fold line as aforesaid.

References Cited in the file of this patent

UNITED STATES PATENTS

| | | |
|---|---|---|
| 1,157,712 | Miller | Oct. 26, 1915 |
| 1,522,311 | Mac Lellan | Jan. 6, 1925 |
| 1,913,655 | Benoit | June 13, 1933 |
| 2,046,751 | Reichel | July 7, 1936 |
| 2,132,632 | Kondolf | Oct. 11, 1938 |
| 2,304,683 | Finn et al. | Dec. 8, 1942 |
| 2,345,746 | Goodyear | Apr. 4, 1944 |
| 2,418,350 | Holy | Apr. 1, 1947 |
| 2,460,229 | Lebold | Jan. 25, 1949 |
| 2,508,943 | Hall et al. | May 23, 1950 |
| 2,537,615 | Arneson | Jan. 9, 1951 |
| 2,586,301 | Castle | Feb. 19, 1952 |